(12) United States Patent
Djian et al.

(10) Patent No.: US 7,642,012 B2
(45) Date of Patent: Jan. 5, 2010

(54) POLYMER SEPARATOR FOR A LITHIUM BATTERY

(75) Inventors: Damien Djian, Fontenay (FR); Sebastien Martinet, Grenoble (FR); Helene Lignier, Saint Laurent du Pont (FR); Jean-Yves Sanchez, Saint Ismier (FR)

(73) Assignee: Commissariat a l'Energie Atomique, Paris (FR)

( * ) Notice: Subject to any disclaimer, the term of this patent is extended or adjusted under 35 U.S.C. 154(b) by 351 days.

(21) Appl. No.: 11/569,162

(22) PCT Filed: May 26, 2005

(86) PCT No.: PCT/FR2005/050375
§ 371 (c)(1),
(2), (4) Date: Nov. 16, 2006

(87) PCT Pub. No.: WO2005/119816
PCT Pub. Date: Dec. 15, 2005

(65) Prior Publication Data
US 2007/0224507 A1  Sep. 27, 2007

(30) Foreign Application Priority Data
May 28, 2004   (FR) .................. 04 51059

(51) Int. Cl.
H01M 4/58 (2006.01)
H01M 2/16 (2006.01)
(52) U.S. Cl. .............. 429/231.5; 429/231.95; 429/249
(58) Field of Classification Search .......... 429/231.5, 429/231.95, 249
See application file for complete search history.

(56) References Cited

U.S. PATENT DOCUMENTS

| 4,303,748 | A | 12/1981 | Armand et al. |
| 5,290,414 | A | 3/1994 | Marple |
| 6,517,972 | B1 | 2/2003 | Amatucci |
| 2001/0024755 | A1 | 9/2001 | Bahar et al. |
| 2002/0192549 | A1 | 12/2002 | Maruyama et al. |
| 2003/0099884 | A1 | 5/2003 | Chiang et al. |

FOREIGN PATENT DOCUMENTS

GB    2 232 982 A    1/1991

OTHER PUBLICATIONS

C. R. Jarvis, et al., "The use of novel VDF-HFP-CTFE terpolymers in lithium-ion polymer cells", Journal of Power Sources, vol. 119-121, XP-004430214, Jun. 1, 2003, pp. 465-468.

A. Du Pasquier, et al., "Plastic PVDF-HFP electrolyte laminates prepared by a phase-inversion process", Solid State Ionics, vol. 135, No. 1-4, XP-004221555, Nov. 1, 2000, pp. 249-257.

Ganesh Venugopal, et al, "Characterization of microporous separators for lithium-ion batteries", Journal of Power Sources, vol. 77, 1999, pp. 31-41.

Kiyoshi Nakahara, et al., "Preparation of particulate $Li_4Ti_5O_{12}$ having excellent characteristics as an electrode active material for power storage cells", Journal of Power Sources, vol. 117, 2003, pp. 131-136.

*Primary Examiner*—Patrick Ryan
*Assistant Examiner*—Thomas H. Parsons
(74) *Attorney, Agent, or Firm*—Oblon, Spivak, McClelland, Maier & Neustadt, L.L.P.

(57) ABSTRACT

A separator for a battery in lithium. The separator is a thick membrane, of around 60 to 120 μm in polyvinylidene fluoride copolymer, which has considerable porosity, of around 50 to 90%, with pores of size between 1 and 10 μm. With these characteristics, it is possible to optimize the operation of a battery with an electrode in, e.g., $Li_4Ti_5O_{12}$, in particular for rapid charges and discharges, in other words in power applications.

20 Claims, 1 Drawing Sheet

POLYMER SEPARATOR FOR A LITHIUM BATTERY

TECHNICAL FIELD

The invention concerns the field of batteries, in particular of the lithium-ion type without graphite electrode.

The invention especially concerns the membranes used as separators between the electrodes in this type of battery. A membrane according to the invention has specific physical characteristics that enable its use for lithium power batteries, in other words in rapid charge and discharge batteries.

STATE OF THE PRIOR ART

A lithium-ion battery generally comprises two electrodes separated by an electrolyte enabling the circulation of lithium ions from one electrode to the other during charging or discharging of the battery. The electrodes are composed of a material active at the electrochemical level and capable of having lithium inserted into its structure. The most widespread lithium-ion technology uses graphite at the anode and a lithiated cobalt oxide at the cathode.

As regards the electrolytes, two approaches have been developed: certain works (see for example U.S. Pat. No. 4,303,748) have led to the use of dry electrolytes, which comprise a polymer in the form of a dense membrane in which a lithium salt is incorporated. The polymers used in this case must have in their structure chemical functions capable of creating strong interactions with the lithium salt in order to dissociate it and thereby enable the transport of lithium ions between the electrodes. While meeting safety criteria, given that each element is solid and in a stable state, the batteries thus obtained do not however have high performance, particularly at ambient temperature: indeed, the ionic conductivity of these systems is very low up to around 60° C. No power operation at ambient temperature can presently be envisaged with this type of dry electrolyte: power batteries must be capable of charging in several minutes and providing strong current peaks during their discharge.

The conventional architecture for the electrolyte in fact concerns a microporous separator that serves as support to a liquid electrolyte, which is lodged in the microporosity and prevents any contact between the two electrodes that could then lead to an internal short circuit (Venugopal G. et al.: "Characterization of microporous separators for lithium-ion batteries", *Journal of Power Sources* 1999; 77: 34-41). The liquid electrolytes are for example constituted of a mixture of cyclic and acyclic carbonate type organic solvents, in which a lithium salt, most usually lithium hexafluorophosphate ($LiPF_6$), is dissolved. Currently available commercial separators are microporous membranes in polyethylene (PE) and/or polypropylene (PP), in which the level of porosity varies from 30 to 50%, of thickness around 25 μm and pore size 100×40 nm$^2$. Polyvinylidene fluoride (PVdF), if necessary copolymerised with propylene hexafluoride (HFP), has also been used.

Furthermore, the present commercially available batteries are charged in one hour at the minimum. However, it is desirable for some applications, known as power applications, that the batteries can be rapidly charged and discharged.

The use of graphite at the negative electrode curbs any power use: indeed, when strong charge currents are passed through, metallic lithium dendrites form at the surface of the anode, leading to an internal short circuit in the case of contact by the dendrites between the two electrodes. This is due to the low insertion potential (100 mV/Li$^+$/Li) of the Li$^+$ ion in graphite. In order to overcome this disadvantage, membranes which are slightly porous or dense and plastified, previously described, have been developed.

In parallel, it has been suggested replacing graphite by lithiated titanium oxide $Li_4Ti_5O_{12}$: the insertion potential of Li$^+$ in this material (1.55 V/Li$^+$/Li) is distinctly higher than in graphite, thereby eliminating any risk of formation of dendrite even under strong currents (Nakahara K. et al.: "Preparation of particulate $Li_4Ti_5O_{12}$ having excellent characteristics as an electrode active material for power storage cells", *Journal of Power Sources* 2003; 117: 131-136). However, the membranes are not optimised for these new electrodes. In particular, the absence of "binder" interaction and compatibility between this electrode and the microporous separator leads to poor mechanical cohesion of the whole.

DESCRIPTION OF THE INVENTION

The main object of the invention is the development of a new polymer membrane for an architecture in which the lithium-ion battery does not use a graphite anode.

More generally, the invention concerns a porous fluorinated membrane, used as separator in a battery, for which the thickness is much greater than for the membranes presently used, in particular between 60 and 120 μm.

The invention further concerns a fluorinated membrane used as separator in a battery, the pores of which having a size between 1 and 10 μm, in other words being very considerable compared to current practices.

Advantageously, the membrane is composed of a polyvinylidene fluoride, preferably copolymerised with propylene hexafluoride.

The porosity of the membrane may be set between 50 and 90%, with a tortuosity less than 2, the pores advantageously being in the form of transversal longitudinal channels.

Advantageously, a membrane according to the invention is used, in a battery with an electrode in which the insertion potential of Li is greater than or equal to 500 mV/Li$^+$/Li, for example in lithium titanate $Li_4Ti_5O_{12}$, if possible in combination with a liquid or gelled electrolyte comprising for example $LiPF_6$.

DETAILED DESCRIPTION OF SPECIFIC EMBODIMENTS

Figure 1:
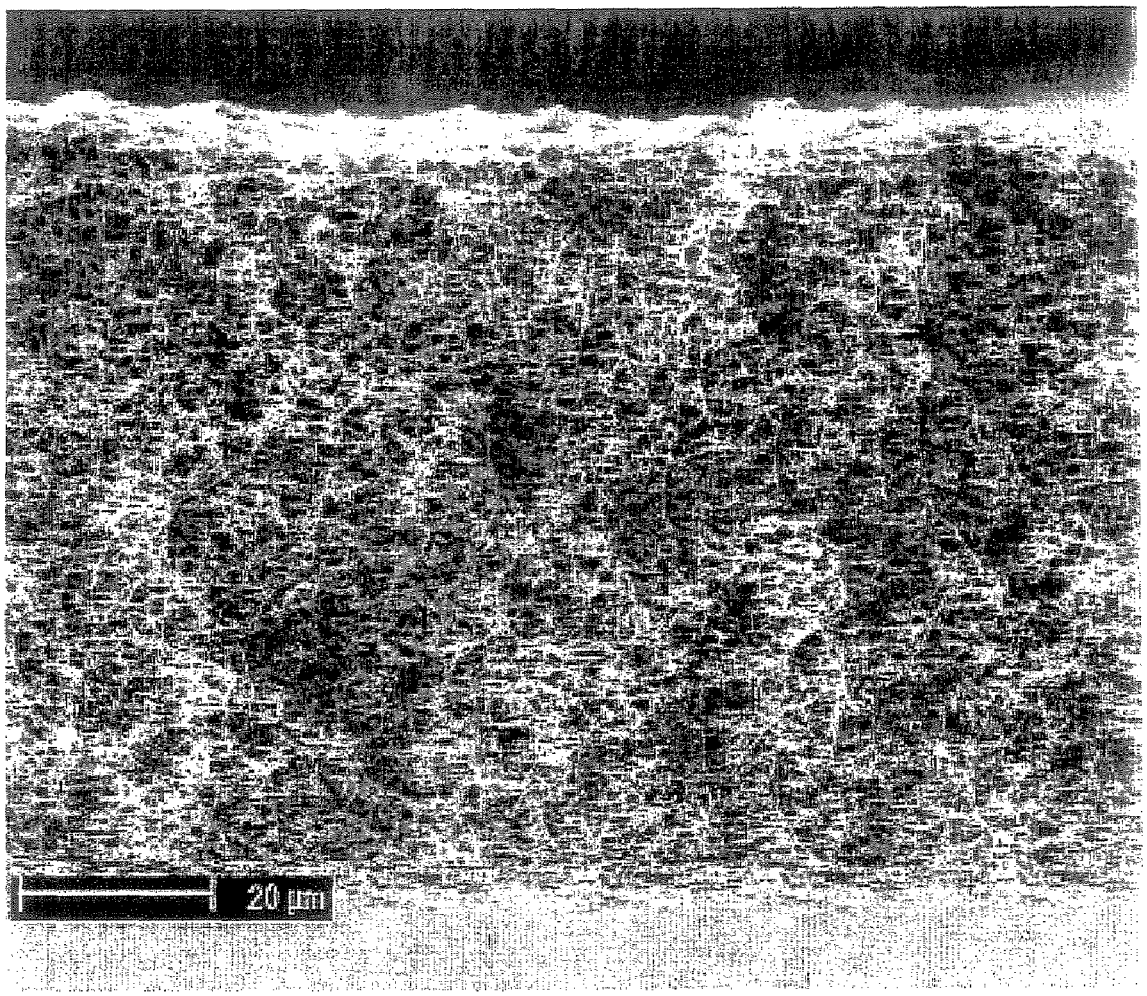
FIG. 1 shows the structure of a membrane according to an embodiment of the invention.

In view of the results described in the prior art concerning "dry" electrolytes, a membrane according to the invention is intended to be used as separator acting as support to a liquid or gelled electrolyte. In order to overcome one of the problems mentioned above, it is moreover desirable to increase the mechanical cohesion between the electrodes and the membrane. This cohesion is provided by the affinity of the membrane with the binder, conventionally a fluorinated polymer, employed to form the electrodes, here notably in $Li_4Ti_5O_{12}$. A fluorinated polymer, homopolymer or preferably copolymer, has thus been selected to form a porous membrane according to the invention.

Such a membrane possesses "hybrid" characteristics between microporous separators and dry polymer membranes. The electrolyte, preferably based on $LiPF_6$, is lodged in part in the microporosity and in part also in the mass of the membrane since it is partially soluble. There are therefore three phases present:
- A dry polymer phase;
- A gelled phase comprising a polymer, an organic solvent and a salt;
- A liquid phase in the pores.

The use of a membrane according to the invention as a separator thereby makes it possible to obtain a liquid/gel/solid triphase system by the addition of the liquid electrolyte; this system has a good ionic conductivity, a good mechanical strength, an excellent cohesion between the membrane and the electrodes and a very low risk of leaks.

The electrical resistance of such a hybrid system is expressed as a function of the resistance of the liquid electrolyte alone according to the equation:

$$R_{syst} = R_{liq} \times \frac{T}{\varepsilon},$$

where $R_{syst}$ is the resistance of the hybrid membrane, $R_{liq}$ the resistance of the liquid electrolyte alone that is used for the formation of the gel, $\varepsilon$ the porosity of the membrane and T the tortuosity of the membrane (the tortuosity characterises the path actually taken by an ion compared to the distance between the two electrodes).

For good power operation, in other words operations with rapid charge and discharge, it is accepted that the resistance of the electrolytic system must be as low as possible. Thus it is preferred that the porosity $\varepsilon$ tends towards 1, given that for this value of 100%, the electrolyte is solely liquid and can therefore no longer assure a physical separation between the two electrodes. Likewise, the tortuosity T is if possible minimal, as close to 1, although, here as well, the membrane remains porous and assures a physical separation between the electrodes.

In order to satisfy these conditions, the membrane polymer according to the preferred embodiment of the invention has a high porosity, from 50 to 90%, preferably greater than 60%, while at the same time assuring a good mechanical strength, and has pores in the form of transversal rectilinear channels, with a tortuosity less than or equal to 2.

Moreover, the resistance of any electrolytic system is linked to its intrinsic conductivity according to the equation:

$$R_{syst} = \frac{1}{\sigma_{syst}} \times \frac{e}{s},$$

where $\sigma_{syst}$ is the conductivity of the electrolytic system, e the distance between the two electrodes and S the surface area of the working electrode.

To reduce the resistance, one therefore increases the surface area of the electrodes while meeting the requirements linked to the architecture of the battery and, conventionally, they are brought closer to reduce e, in other words the thickness of the membrane is reduced. In fact, the first membranes formed for the invention were thin, typically between 20 and 50 µm as the prior art indicates.

However, it turns out that the best power performances have been obtained with thick membranes, 60-70 to 120 µm.

This unexpected effect has been explained by the diffusion mechanisms that take place within the electrolyte. The flow of lithium ions between the two electrodes is due to the cumulated effect of migration and diffusion (there is no convection): migration is due to the electrical potential gradient and diffusion at the concentration gradient. The molar flux density in lithium $N_{Li}$ is then expressed according to the equation: $N_{Li}=N_{Li}^{m}+N_{Li}^{d}$.

For strong currents during a power use of the battery, the Li$^+$ ions have to be rapidly available at the surface of the reducing electrode. It turns out that the use of a thick membrane makes it possible within the scope of the invention to constitute a sufficiently sizeable reservoir of ions to assure the insertion of the lithium in the electrode for strong current peaks. The diffusion of the ions is thereby sufficiently high to be able to then assure the recharge of this reservoir during the operation of the battery.

The solution proposed for a membrane for battery separator, especially with an anode in lithium titanate, is thus based on the use of a fluorinated membrane, highly microporous (50 to 90%, preferably around 60-70%) and thick (around 100 µm). This membrane may be obtained by conventional processes for implementing membranes, from a polyvinylidene fluoride (PVdF) type fluorinated polymer including a large family of copolymers in which PVdF copolymerised with propylene hexafluoride (PVdF/HFP).

Moreover, the size of the pores of a membrane according to the invention is advantageously greater than one micron. This increase induces a decrease in the tortuosity and thereby favours the migration and the diffusion of Li$^+$ ions in the electrolyte.

EXAMPLE OF AN EMBODIMENT

A membrane according to the invention is formed by the phase inversion technique, which is based on four steps:

(i) The polymer, PVdF/HFP, is solubilised in one of its solvents in order to obtain a solution having an apparent viscosity of around 1800 cP, for example N-methylpyrolidone (NMP).

(ii) This solution is then coated on a rigid, flat and not very adherent support, by means of a doctor blade, in other words an adjustable slot height film applicator, and in which the thickness of the slot is controlled, ideally at 500 µm.

(iii) The coated support is soaked for 5 to 10 minutes at ambient temperature in a bath of a solution miscible with the first solvent, but in which the polymer does not dissolve; this solution may for example be any type of alcohol, in particular ethanol.

(iv) Once the coagulation of the polymer has been achieved, the plate with the membrane is placed in an oven for drying for around 24 hours between 50 and 60° C.

The membrane thereby obtained illustrates the preferred embodiment of this invention, with a porosity between 50 and 90%, a thickness between 60 and 120 µm, a tortuosity less than 2, and in which the size of the pores may range from 1 to 10 µm. It does not have surface skin and the porosity is open as shown in FIG. 1.

COMPARATIVE EXAMPLE

The membrane thereby formed was compared to a commercially available membrane based on a Celgard® type polyolefin. The two membranes were tested in a battery with a negative electrode constituted of lithium titanate $Li_4Ti_5O_{12}$, which has a specific capacitance of 160 mAh/g and a potential of 1.55 V/Li$^+$/Li, and a positive electrode constituted of lithiated transition metal oxide, here manganese oxide $LiMn_2O_4$, of capacitance 120 mAh/g and potential 4.1 V/Li$^+$/Li; the titanate is in deficiency compared to manganese oxide. The grammage of the negative electrode is 0.27 mAh/cm² and the capacity of the battery is 0.4 mAh. The liquid electrolyte used in association with the membranes is LP30 supplied by Merck®, of composition EC/DMC 1/1, $LiPF_6$ 1M.

The results are presented in the following table:

TABLE I

Characteristics and battery performances of a commercially available membrane and a membrane according to the invention

|  | Celgard ® 2400 | Membrane according to the invention |
|---|---|---|
| Polymer | PP | PVdF/HFP |
| Thickness (μm) | 25 | 100 |
| Porosity (%) | 37 | 65 |
| Tortuosity | 2.4 | 1.9 |
| Pore size (μm) | 0.1 | 5 |
| Recovered capacitance at 20C (% compared to C) | 65 | 85 |

For a charge regime at 20C (complete charge of the battery at constant current in 3 minutes, i.e. 1/20 h), the loss of capacitance is higher with the Celgard® membrane than with the membrane formed. Thus a battery using the microporous fluorinated membrane as separator can be recharged to 85% and more of its initial capacitance in 3 minutes compared to 65% at the most for a commercially available membrane: the power performance levels obtained are better than with commercially available microporous membranes.

The invention claimed is:

1. A battery comprising:
   a positive electrode;
   a negative electrode in a material having a lithium insertion potential greater than 500 mV/Li⁺/Li; and
   a membrane comprising a fluorinated polymer, the thickness of which is between 100 and 120 μm and having pores, as a separator.

2. A battery according to claim 1, wherein the pores of the membrane have a size between 1 and 10 μm.

3. A battery according to claim 1, wherein the polymer of the membrane is a polyvinylidene fluoride.

4. A battery according to claim 1, wherein polymer is a copolymer.

5. A battery according to claim 1, wherein the polymer of the membrane is polyvinylidene fluoride copolymerized with propylene hexafluoride.

6. A battery according to claim 5, wherein the pores of the membrane have a size between 1 and 10 μm.

7. A battery according to claim 1, wherein porosity of the membrane is between 50 and 90%.

8. A battery according to claim 5, wherein porosity of the membrane is between 50 and 90%.

9. A battery according to claim 1, wherein porosity of the membrane is open.

10. A battery according to claim 1, wherein the pores of the membrane are in a form of transversal longitudinal channels.

11. A battery according to claim 1, wherein tortuosity of the membrane is less than or equal to 2.

12. A battery according to claim 1, wherein the negative electrode is in lithium titanate or $Li_4Ti_5O_{12}$.

13. A battery according to claim 1, further comprising a liquid electrolyte or an electrolyte in gel form in the separator.

14. A battery comprising:
    a positive electrode;
    a negative electrode in lithium titanate; and
    a membrane comprising a polymer of polyvinylidene fluoride as a separator, the membrane having a thickness between 100 and 120 μm and a porosity between 50 and 90%.

15. A battery according to claim 14, wherein tortuosity of the membrane is less than or equal to 2.

16. A battery according to claim 14, wherein pores of the membrane have a size between 1 and 10 μm.

17. A battery according to claim 14, wherein the porosity of the membrane is open.

18. A battery according to claim 14, wherein pores of the membrane are in a form of transversal longitudinal channels.

19. A battery according to claim 14, further comprising an electrolyte in gel or liquid form in the separator.

20. A battery comprising:
    a positive electrode;
    a negative electrode in lithium titanate;
    a membrane comprising polyvinylidene fluoride copolymerized with propylene hexafluoride as a separator; and
    an electrolyte in liquid or gel form in the membrane, wherein the membrane has a thickness between 100 and 120 μm, an open porosity between 50 and 90% with a pore size between 1 and 10 μm, and a tortuosity less than 2.

* * * * *